(12) United States Patent
Lyons et al.

(10) Patent No.: US 12,093,652 B2
(45) Date of Patent: Sep. 17, 2024

(54) SYSTEMS AND METHODS FOR CONTENT FRAMING MONITORING AND INTERVENTION

(71) Applicant: Toyota Research Institute, Inc., Los Altos, CA (US)

(72) Inventors: Kent Lyons, Los Altos, CA (US); Charlene C. Wu, San Francisco, CA (US); Matthew Lee, Mountain View, CA (US); Rumen Iliev, Millbrae, CA (US); Yanxia Zhang, Foster City, CA (US); Yue Weng, San Mateo, CA (US)

(73) Assignee: Toyota Research Institute, Inc., Los Altos, CA (US)

( * ) Notice: Subject to any disclaimer, the term of this patent is extended or adjusted under 35 U.S.C. 154(b) by 666 days.

(21) Appl. No.: 17/222,045

(22) Filed: Apr. 5, 2021

(65) Prior Publication Data

US 2022/0318511 A1    Oct. 6, 2022

(51) Int. Cl.
| | | |
|---|---|---|
| *G06F 40/30* | (2020.01) | |
| *G06F 40/166* | (2020.01) | |
| *G06F 40/279* | (2020.01) | |
| *G06N 3/04* | (2023.01) | |
| *G06N 3/08* | (2023.01) | |

(52) U.S. Cl.
CPC ............ *G06F 40/30* (2020.01); *G06F 40/166* (2020.01); *G06F 40/279* (2020.01); *G06N 3/04* (2013.01); *G06N 3/08* (2013.01)

(58) Field of Classification Search
CPC ...... G06F 40/30; G06F 40/166; G06F 40/279; G06N 3/04; G06N 3/08

USPC ............................................................. 704/9
See application file for complete search history.

(56) References Cited

U.S. PATENT DOCUMENTS

| 10,423,727 B1* | 9/2019 | Juneja ..................... G10L 15/22 |
|---|---|---|
| 10,742,658 B2 | 8/2020 | Lelcuk et al. |
| 2004/0098265 A1 | 5/2004 | Kelly et al. |
| 2014/0113263 A1 | 4/2014 | Jarrell et al. |
| 2017/0212892 A1 | 7/2017 | McIntosh et al. |
| 2018/0357557 A1 | 12/2018 | Williams et al. |
| 2020/0168343 A1 | 5/2020 | Datla et al. |
| 2020/0380597 A1 | 12/2020 | Furbish et al. |

OTHER PUBLICATIONS

Rahul Kapoor, Positive or Negative Framing of Data and its Overall Effect, Feb. 9, 2021, pp. 1-10. (Year: 2021).*
F. Morstatter et al., "Identifying Framing Bias in Online News", 18 pages, https://isi.edu/~fredmors/paperpdfs/a5-morstatter.pdf.

* cited by examiner

*Primary Examiner* — Thierry L Pham
(74) *Attorney, Agent, or Firm* — DINSMORE & SHOHL LLP

(57) ABSTRACT

Systems and methods for content framing monitoring and intervention are disclosed. In one example, a method includes receiving, at a computing device, first text conveying first information, performing natural language processing of the first text, determining a first framing of the first information based on the natural language processing of the first text, determining second text conveying the first information with a second framing, different from the first framing, and outputting the second text on an electronic display.

18 Claims, 4 Drawing Sheets

SYSTEMS AND METHODS FOR CONTENT FRAMING MONITORING AND INTERVENTION

FIELD

The present specification generally relates to information presentation and, more specifically, to systems and methods for content framing monitoring and intervention.

BACKGROUND

News stories, articles, and other types of information can present information in a variety of different frames. For example, the survival rate of a medical procedure may be framed as "5% of patients do not survive the procedure". Alternatively, the same medical procedure may be framed as "95% of patients survive the medical procedure". Although the same information is being presented in both instances, the different framing of the information may influence how it is perceived by a reader. If a first individual reads the first framing, which presents the percentage of patients that do not survive the medical procedure, the first individual is likely to think that the procedure has a higher risk than a second individual who reads the second framing, which presents the percentage of patients that do survive the procedure.

By framing information in particular ways, content creators may manipulate readers into having biased views about the information, even when the information is presented accurately. Accordingly, a need exists for counteracting the presentation of information with biased framing.

SUMMARY

In an embodiment, a method may include receiving, at a computing device, first text conveying first information, performing natural language processing of the first text, determining a first framing of the first information based on the natural language processing of the first text, determining second text conveying the first information with a second framing, different from the first framing, and outputting the second text on an electronic display.

In an embodiment, a system may include a processing device and a non-transitory, processor-readable storage medium comprising one or more programming instructions stored thereon. When executed, the instructions may cause the processing device to receive first text conveying first information, perform natural language processing of the first text, determine a first framing of the first information based on the natural language processing of the first text, determine second text conveying the first information with a second framing, different from the first framing, and output the second text on an electronic display.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, wherein like structure is indicated with like reference numerals and in which:

DETAILED DESCRIPTION

Referring generally to the figures, embodiments described herein are directed to systems and methods for content framing monitoring and intervention. When information is presented to users, the information may be presented with a variety of different frames. For example, information may be presented with a positive or negative frame. In some examples, information may be presented with a more or less arousing frame, which may generate more or less interest from users. In other examples, information may be presented with a frame having varying levels of intensity. As such, a reader of the information may be presented with a misleading picture of the information based on the frame in which it is presented.

Accordingly, in the embodiments disclosed herein, a system may detect a framing of digital information being presented to a user. The system may utilize natural language processing or other techniques, as described herein, to detect whether the information is being presented with a biased frame. If the system detects that information is being presented with a biased frame, in some examples, the system may indicate the biased framing to the user. This may make the user aware of the biased framing, which may cause the user to consider the information more critically. In some examples, the system may present the information to the user with the opposite framing, in addition to the original framing. This may allow the user to evaluate the information in a more unbiased manner. In still other examples, the system may keep track of the framing of information received by a user over time and present this to the user. As such, the user may become aware of the cumulative effect of the framing of information received over time.

Figure 1:
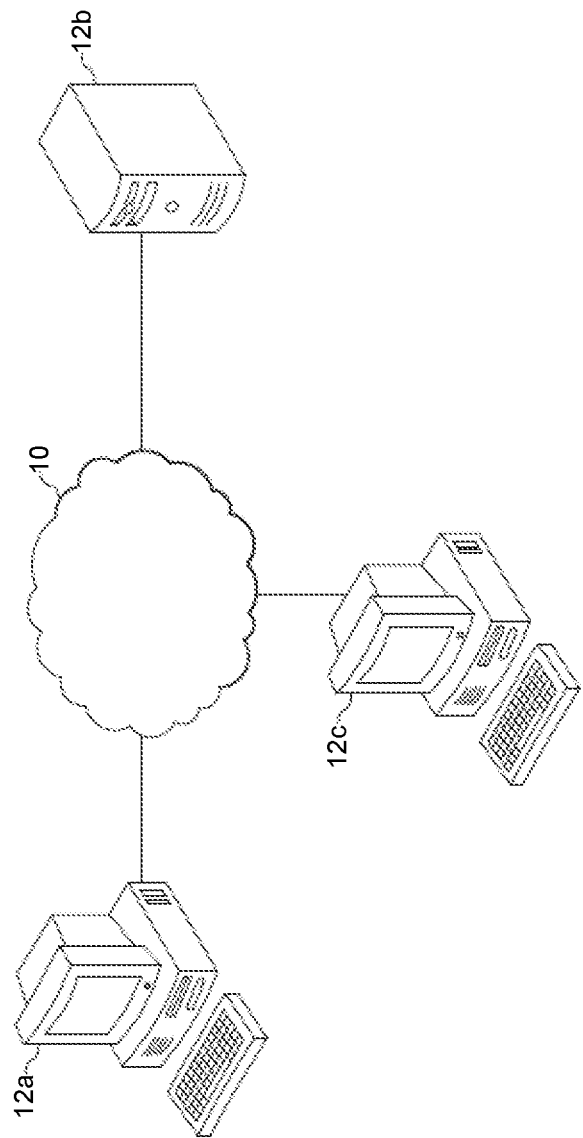
FIG. 1 schematically depicts an illustrative computing network for content framing monitoring and intervention according to one or more embodiments shown and described herein.

Referring now to the drawings, FIG. 1 depicts an illustrative computing network, illustrating components of a system for performing the functions described herein, according to embodiments shown and described herein. As illustrated in FIG. 1, a computer network 10 may include a wide area network, such as the internet, a local area network (LAN), a mobile communications network, a public service telephone network (PSTN) and/or other network and may be configured to electronically connect a user computing device 12a, a server computing device 12b, and an administrator computing device 12c.

The user computing device 12a may be used to facilitate retrieving documents or other information upon which content framing monitoring and intervention may be performed. For example, the user computing device 12a may be a personal computer that that user utilizes to browse the Internet, use social medial platforms, read news, watch videos, and the like. As the user computing device 12a is used to perform these actions, a user may be presented with various types of information. For example, the user may read news articles or watch videos that present information to the user. The user computing device 12a may include an electronic display that displays information retrieved by a user. Accordingly, the techniques described herein for content framing monitoring and intervention may be used on information retrieved by a user with the user computing device 12a. In other examples, the user computing device 12a may be a tablet, a smartphone, a smart watch, or any other type of computing device used by a user to receive information.

The administrator computing device 12c may, among other things, perform administrative functions for the server computing device 12b. In the event that the server computing device 12b requires oversight, updating, or correction, the administrator computing device 12c may be configured to provide the desired oversight, updating, and/or correction. The administrator computing device 12c, as well as any other computing device coupled to the computer network 10, may be used to input one or more word embeddings into a word embedding database.

The server computing device 12b may receive information being retrieved by the user computing device 12a and may perform content framing monitoring and intervention, as disclosed herein. The server computing device 12b may then transmit information to be displayed by the user computing device 12a based on the content framing monitoring and intervention that is performed. In some examples, the server computing device 12b may be removed from the system of FIG. 1 and may be replaced by a software application on the user computing device 12a. For example, the functions of the server computing device 12b may be performed by a browser plugin on the user computing device 12a that operates while a user is browsing the Internet on the user computing device 12a. The components and functionality of the server computing device 12b will be set forth in detail below.

It should be understood that while the user computing device 12a and the administrator computing device 12c are depicted as personal computers and the server computing device 12b is depicted as a server, these are non-limiting examples. More specifically, in some embodiments any type of computing device (e.g., mobile computing device, personal computer, server, etc.) may be utilized for any of these components. Additionally, while each of these computing devices is illustrated in FIG. 1 as a single piece of hardware, this is also merely an example. More specifically, each of the user computing device 12a, the server computing device 12b, and the administrator computing device 12c may represent a plurality of computers, servers, databases, etc.

Figure 2:
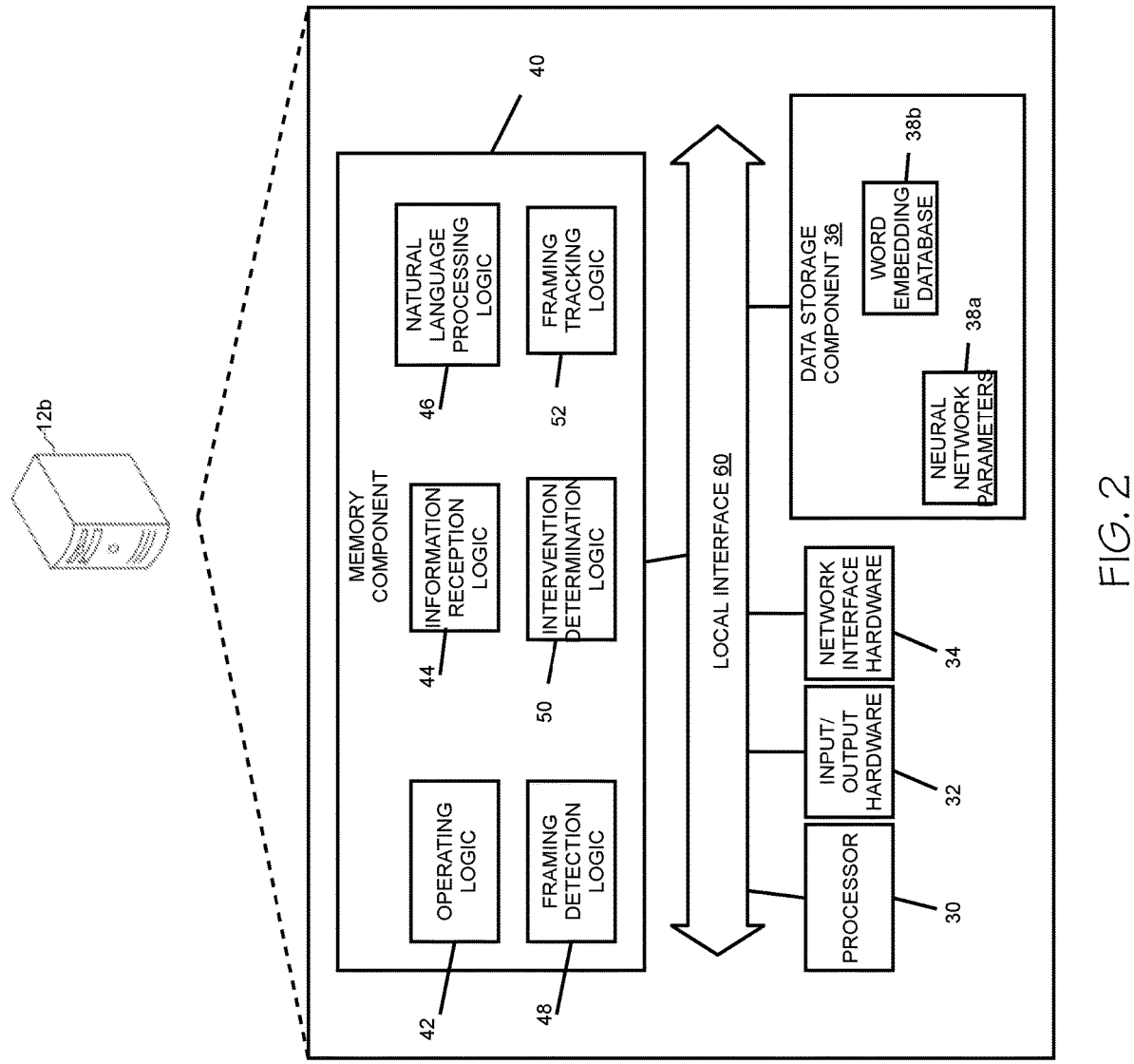
FIG. 2 schematically depicts the server computing device from FIG. 1, further illustrating hardware and software that may be used in content framing monitoring and intervention according to one or more embodiments shown and described herein.

FIG. 2 depicts additional details regarding the server computing device 12b from FIG. 1. While in some embodiments, the server computing device 12b may be configured as a general purpose computer with the requisite hardware, software, and/or firmware, in some embodiments, that server computing device 12b may be configured as a special purpose computer designed specifically for performing the functionality described herein.

As also illustrated in FIG. 2, the server computing device 12b may include a processor 30, input/output hardware 32, network interface hardware 34, a data storage component 36 (which may store neural network parameters 38a and a word embedding database 38b), and a non-transitory memory component 40. The memory component 40 may be configured as volatile and/or nonvolatile computer readable medium and, as such, may include random access memory (including SRAM, DRAM, and/or other types of random access memory), flash memory, registers, compact discs (CD), digital versatile discs (DVD), and/or other types of storage components. Additionally, the memory component 40 may be configured to store operating logic 42, information reception logic 44, natural language processing logic 46, framing detection logic 48, intervention determination logic 50, and framing tracking logic 52 (each of which may be embodied as a computer program, firmware, or hardware, as an example). A local interface 60 is also included in FIG. 2 and may be implemented as a bus or other interface to facilitate communication among the components of the server computing device 12b.

The processor 30 may include any processing component configured to receive and execute instructions (such as from the data storage component 36 and/or memory component 40). The input/output hardware 32 may include a monitor, keyboard, mouse, printer, camera, microphone, speaker, touch-screen, and/or other device for receiving, sending, and/or presenting data. The network interface hardware 34 may include any wired or wireless networking hardware, such as a modem, LAN port, wireless fidelity (Wi-Fi) card, WiMax card, mobile communications hardware, and/or other hardware for communicating with other networks and/or devices.

It should be understood that the data storage component 36 may reside local to and/or remote from the server computing device 12b and may be configured to store one or more pieces of data for access by the server computing device 12b and/or other components. As illustrated in FIG. 2, the data storage component 36 may store the neural network parameters 38a and the word embedding database 38b, described in further detail below.

Included in the memory component 40 are the operating logic 42, the information reception logic 44, the natural language processing logic 46, the framing detection logic 48, the intervention determination logic 50, and the framing tracking logic 52. The operating logic 42 may include an operating system and/or other software for managing components of the server computing device 12b.

The information reception logic 44 may receive information to be analyzed for framing monitoring and intervention. In some examples, the information reception logic 44 may receive information from the user computing device 12a. In other examples, the information reception logic 44 may receive information from other hardware or software components.

In embodiments, the information reception logic 44 may receive text to be analyzed. The text received by the information reception logic 44 may include information that is being viewed by a user of the user computing device 12a. In some examples, the text may comprise a portion of a website, news article, a social media posting, and the like. In some examples, the text may be a transcription of a video. The text may comprise one or more words or phrases conveying information. After text is received by the information reception logic 44, the text may be analyzed by the natural language processing logic 46.

The natural language processing logic 46 may perform natural language processing on the text received by the information reception logic 44, as disclosed herein. Then, the frame detection logic 48 may determine a framing of the information based on the natural language processing performed by the natural language processing logic 46.

The natural language processing logic 46 may perform natural language processing using a variety of techniques to look for patterns in received text. In some examples, the natural language processing logic 46 may utilize a neural network and supervised learning techniques to perform natural language processing and detect a framing of information. In these examples, a number of words or phrases may be labeled as having a certain frame by one or more individuals reviewing the words or phrases. For instance, in the example discussed above regarding a medical procedure, the phrase "5% of patients do not survive the procedure" may be labeled as a negative framing and the phrase "95% of patients survive the medical procedure" may be labeled as a positive framing. Similar labels may be associated with other phrases.

These labeled phrases may comprise training data for an artificial neural network, which may be trained on the training data as a classifier to determine a framing of an input phrase using supervised machine learning techniques. After the neural network is trained, the trained neural network parameters may be stored as neural network parameters 38a in the data storage component 36. Then, when the information reception logic 44 receives a phrase, the natural language processing logic 46 may input the phrase into the trained neural network and the neural network may output a framing.

In another example, the natural language processing logic 46 may utilize unsupervised learning techniques to perform natural language processing. For example, the natural language processing logic 46 may utilize a pre-trained embedding model to perform an embedding of words or phrases received by the information reception logic 44. That is, the natural language processing logic 46 may use a tool such as Word2vec, Bidirectional Encoder Representations from Transformers (BERT), or other embeddings to create a vector representation of a word or phrase. The vector representation may indicate a framing of text, as disclosed herein. The natural language processing logic 46 may utilize the word embedding database 38b in the data storage component 36 to perform an embedding of a word or phrase received by the information reception logic 44.

The framing detection logic 48 may detect a framing associated with text based on the processing performed by the natural language processing logic 46. In an example where the natural language processing logic 46 uses supervised learning techniques, a neural network may output a framing of the text based on the parameters of the neural network. As such, the framing detection logic 48 may detect the framing of the text as the frame output by the neural network.

In examples where unsupervised learning techniques are used by the natural language processing logic 46, the framing detection logic 48 may determine a framing based on an embedding performed by the natural language processing logic 46. For example, the word embedding database 38b may include framings associated with various embedding of phrases. As such, after the natural language processing logic 46 performs an embedding of a word or phrase, the framing detection logic 48 may determine a framing of the word or phrase based on the framing associated with the embedding of the word or phrase.

The framing detection logic 48 may detect a variety of parameters associated with a frame. In one example, the framing detection logic 48 determines whether a framing of information is positive or negative, such as in the example described above with respect to the survival rate of a medical procedure. In some examples, the framing detection logic 48 may determine whether a framing of information is positive, negative, or neutral. In other examples, the framing detection logic 48 may determine an intensity of a framing of information. For example, the framing detection logic 48 may determine that a certain framing of information is strongly positive or weakly negative. In some examples, the framing detection logic 48 may determine a value that quantifies an intensity of a framing of information. For example, the framing detection logic 48 may determine a value from −1 to 1, where −1 represents a maximally negative framing, 1 represents a maximally positive framing, 0 represents a neutral framing, and values in between may represent various intensities of positive or negative framing.

In some examples, the framing detection logic 48 may determine a framing of information based on two-dimensions. For example, the framing detection logic 48 may determine a framing of information based on valence and arousal. A valence of a framing may correspond to how positive or negative a framing of information is as discussed above. An arousal level of a framing may correspond to how much it arouses interest in a reader. For example, certain information may be presented in a strongly positive or negative way that does not greatly arouse interest in a reader. As such, this type of framing may have a strong valence score but a low arousal score. Alternatively, other information may be presented in a way that more strongly arouses interest in a reader. This type of framing may have a high arousal score. Information that is presented with a strong positive or negative framing but not in a highly arousing way may have a smaller effect in biasing a reader than information that has a stronger arousal framing.

The intervention determination logic 50 may perform an intervention based on the framing of information detected by the framing detection logic 48. In particular, the intervention determination logic 50 may determine whether a framing of certain information presented to a user is sufficiently biased in a particular manner and if so, the intervention determination logic 50 may intervene to reduce the bias. For example, the intervention determination logic 50 may present the information to the user having the opposite framing or having a framing with reduced intensity, as disclosed herein.

In one example, the intervention determination logic 50 may determine that certain information is presented with a positive framing and may replace or supplement the information with a negative framing of the information. Alternatively, the intervention determination logic 50 may determine that certain information is presented with a negative framing and may replace or supplement the information with a positive framing of the information. For example, if the information reception logic 44 receives the phrase "5% of patients do not survive a medical procedure", the framing detection logic 48 may determine that this information is being presented with a negative framing and the intervention determination logic 50 may rewrite the sentence as "95% of patients survive the medical procedure". The intervention determination logic 50 may then present the rewritten sentence to the user in place of the original sentence or in addition to the original sentence. By presenting different framings of information to a user, the user may get a more balanced view of the information and may be less likely to form inaccurate assumptions based on biased framing.

In the example described above, the intervention determination logic 50 rewrites a phrase so as to present the same information contained in the original phrase with the opposite framing. In one example, the intervention determination logic 50 may utilize a look-up table to identify words and phrases having an opposite framing. That is, when the framing detection logic 48 determines that a phase has a particular framing, the intervention determination logic 50 may look up words of the phrase in the look-up table and finds corresponding words having the opposite framing. The intervention determination logic 50 may then rewrite the phrase with the words found in the look-up table.

In another example, the intervention determination logic 50 may utilize an embedding of a word or phrase determined by the natural language processing logic 46 to determine an intervention. For example, the intervention determination logic 50 may sample possible words or phrases and determine an embedding of each sampled word or phrase (e.g., using Word2vec or BERT embedding). The intervention determination logic 50 may then determine a similarity between the embedding of the sampled words or phrases and the embedding of the original word or phrase. For example, the intervention determination logic 50 may determine a cosine similarity between the embedding of the samples words or phrases and the embedding of the original word.

In one example, the intervention determination logic 50 may select sampled words that have an embedding whose cosine similarity to the embedding of the original phrase is within a predetermined range. For example, the intervention determination logic 50 may select sampled words having a cosine similarity to the embedding of the words of the original phrase closest to −1. As such, these words are likely to have an opposite framing from the words in the original phrase. The intervention determination logic 50 may then replace the words in the original phrase with the selected words to rewrite the original information in a manner that has an opposite framing.

In another example, the intervention determination logic 50 may select sampled words having a cosine similarity to words of the original phrase closest to 1 but having a smaller magnitude. As such, these words are likely to have a less intense framing from the words in the original phrase. The intervention determination logic 50 may then replace the words in the original phrase with the selected words to rewrite the original information in a manner that a less intense framing.

In some examples, the intervention determination logic 50 may determine whether an intensity of a framing is above a predetermined threshold. In these examples, the intervention determination logic 50 may decide to intervene, using one of the methods described above, only when the framing is above a predetermined threshold. As such, the intervention determination logic 50 may only get involved when a framing of information is particularly biased. In other examples, the intervention determination logic 50 may determine whether an arousal level of a framing of information is above a predetermined threshold and may only intervene when the arousal level is above the predetermined threshold.

Once the intervention determination logic 50 has determined an intervention to perform, the intervention determination logic 50 may present in the intervention in a variety of ways. For example, the intervention determination logic 50 may output the determined intervention on an electronic display (e.g., the user computing device 12*a*). In some examples, the intervention determination logic 50 may replace text containing certain information being presented to the user with different text that present the same information with a different framing (e.g., an opposite framing or a less intense framing).

For example, the server computing device 12*b* may operate a browser plug-in on the user computing device 12*a*, which may monitor information being presented to the user through a browser. When the framing detection logic 48 detects information being presented to the user with a certain framing (e.g., a framing above a certain intensity level), the intervention determination logic 50 may replace the original framing of the information with a modified framing of the information (e.g., a framing with lower intensity). The modified framing of the information may then be presented to the user by displaying the information with the modified framing on an electronic display (e.g., a display of the user computing device 12*a*). In this example, the user never sees the original framing of the information and instead, only sees the modified framing of the information.

In other examples, the intervention determination logic 50 may present the information to the user with both the original framing and a modified framing (e.g., a positive framing and a negative framing). This may allow the user to receive a more balanced presentation of the information.

The framing tracking logic 52 may track the framing of information being presented to a user over time. For example, every time that the framing detection logic 48 determines that information is being presented to a user having a framing with an intensity above a predetermined threshold, the framing tracking logic 52 may record the framing of the information. In some embodiments, the framing tracking logic 52 may record this information in the data storage component 36. Then, the framing tracking logic 52 may present a running total of the various framings of information or other statistics associated with information framing that has been presented to the user. For example, the framing tracking logic 52 may display to a user that over a certain time period (e.g., the last hour), the user has viewed information having a positive framing a certain percentage of the time and information having a negative framing another percentage of time. This may make the user aware that they are potentially receiving information in a biased manner.

Figure 3:
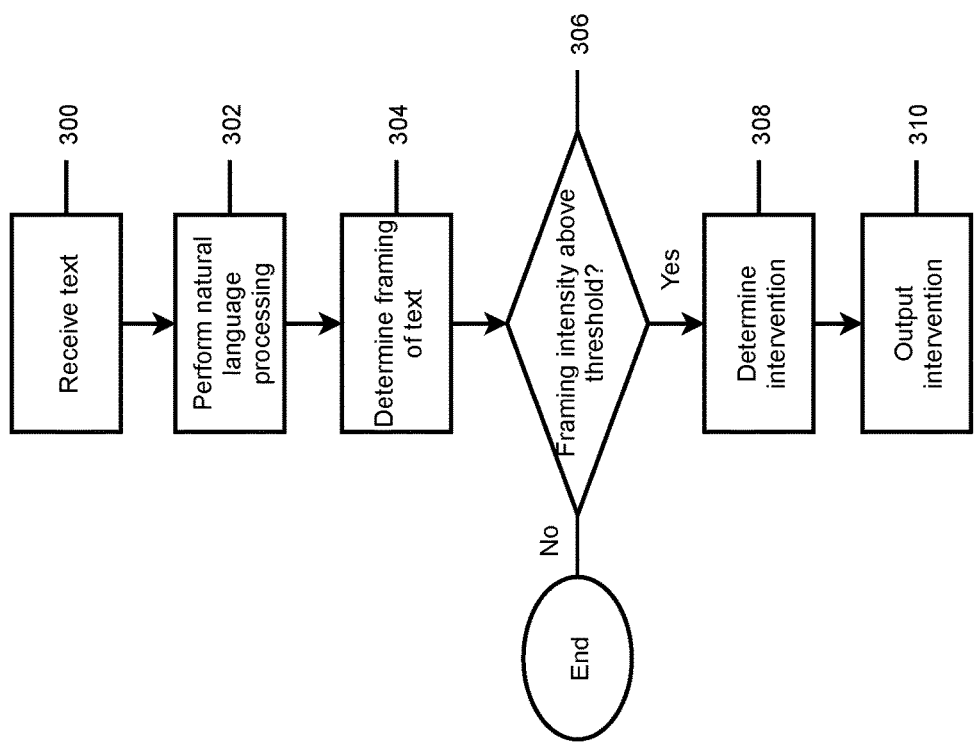
FIG. 3 depicts a flow diagram of an illustrative method of performing content framing monitoring and intervention according to one or more embodiments shown and described herein.

As mentioned above, the various components described with respect to FIG. 2 may be used to carry out one or more processes and/or provide functionality for content framing monitoring and intervention. An illustrative example of the various processes is described with respect to FIG. 3. Although the steps associated with the blocks of FIG. 3 will be described as being separate tasks, in other embodiments, the blocks may be combined or omitted. Further, while the steps associated with the blocks of FIG. 3 will be described as being performed in a particular order, in other embodiments, the steps may be performed in a different order.

At step 300, the information reception logic 44 receives text presented to a user of the user computing device 12*a*. The text may be from a web page, a news article, a social media posting, a transcription of a video, or other information being viewed by the user. The text may comprise one or more words or phrases being presented to the user.

At step 302, the natural language processing logic 46 performs natural language processing of the text received by the information reception logic 44. The natural language processing performed by the natural language processing logic 46 may comprise determining an embedding of one or more words or phrases in the text.

At step 304, the framing detection logic 48 determines a framing of information contained in the text based on the natural language processing performed by the natural language processing logic 46. In some examples, the framing detection logic 48 may determine whether a framing is positive or negative. In other examples, the framing detection logic 48 may determine an intensity of the framing. In other examples, the framing detection logic 48 may determine a valence of the framing and an arousal level of the framing.

At step 306, the framing detection logic 48 may determine whether the intensity of the framing is above a predetermined threshold. If the framing detection logic 48 determines that the intensity of the framing is not above the predetermined threshold (no at step 306), then the process of FIG. 3 ends. If the framing detection logic 48 determines that the intensity of the framing is above the predetermined threshold (yes at step 306), then control passes to step 308.

At step 308, the intervention determination logic 50 determines an intervention based on the framing determined by the framing detection logic 48. In some examples, the intervention determination logic 50 rewrites the text to present information having an opposite framing as the framing of the text. In other examples, the intervention determination logic 50 rewrites the text to present information having a framing with a decreased intensity.

At step 310, the intervention determination logic 50 causes the determined intervention to be presented to the user on an electronic display. In some examples, the original text is replaced by revised text determined by the intervention determination logic 50. In other examples, the original text is supplemented by the revised text determined by the intervention determination logic 50.

Figure 4:
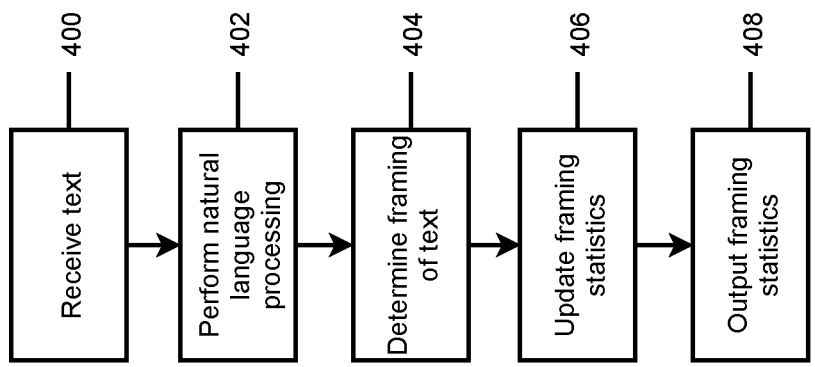
FIG. 4 depicts a flow diagram of another illustrative method of performing content framing monitoring and intervention according to one or more embodiments shown and described herein.

Another illustrative example of processes for performing content framing monitoring and intervention is shown in FIG. 4. At step 400, the information reception logic 44 receives text presented to a user of the user computing device 12a. The text may be from a web page, a news article, a social media posting, a transcription of a video, or other information being viewed by the user. The text may comprise one or more words or phrases being presented to the user.

At step 402, the natural language processing logic 46 performs natural language processing of the text received by the information reception logic 44. The natural language processing performed by the natural language processing logic 46 may comprise determining an embedding of one or more words or phrases in the text.

At step 404, the framing detection logic 48 determines a framing of information contained in the text based on the natural language processing performed by the natural language processing logic 46. In some examples, the framing detection logic 48 may determine whether a framing is positive or negative. In other examples, the framing detection logic 48 may determine an intensity of the framing. In other examples, the framing detection logic 48 may determine a valence of the framing and an arousal level of the framing.

At step 406, the framing tracking logic 52 updates statistics about the framing of information that has been presented to the user. In some examples, the statistics may comprise a running total of the different framings of information that has been presented to the user over a particular time period. In other examples, other statistics about framing of information presented to the user may be updated. Then, at step 408, the framing tracking logic 52 outputs the updated statistics to the user.

It should now be understood that embodiments described herein are directed to systems and methods for content framing monitoring and intervention. Text containing certain information may be received by a computing device. The text may contain information presented with a certain framing. Natural language processing may be performed on the text, which may comprise determining an embedding of one or more words or phrases in the text. A framing of the information in the text may be determined based on the natural language processing. An intervention may occur based on the detected framing. The intervention may include rewriting the text with an opposite framing or a less intense framing and replacing or supplementing the original text with the rewritten text. The modified text may be presented to the user on an electronic display. Multiple framings of information presented to a user may also be tracked over time and statistics about the framings may be presented to the user.

By making a user aware of how information is being framed and/or by presenting the same information with a different or less intense framing, the user may be less subject to interpreting the received information in a biased manner. The embodiments described herein may be embodied as a browser plugin, a software add-in a social media feature, a smartphone application, or any other application where a user views information with an electronic display.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method comprising:
receiving, at a computing device, first text conveying first information;
performing natural language processing of the first text;
determining a first framing of the first information based on the natural language processing of the first text;
determining a valence of the first framing;
determining an arousal level of the first framing;
generating, based on the valence of the first framing and the arousal level of the first framing, second text conveying the first information with a second framing, different from the first framing; and
outputting the second text on an electronic display.

2. The method of claim 1, wherein the second framing is an opposite framing from the first framing.

3. The method of claim 1, wherein the second framing has less intensity than the first framing.

4. The method of claim 1, further comprising outputting the second text to replace the first text.

5. The method of claim 1, further comprising outputting the second text as a supplement to the first text.

6. The method of claim 1, further comprising:
determining an intensity of the first framing;
determining whether the intensity of the first framing is greater than a predetermined threshold; and only determining the second text upon determination that the intensity of the first framing is greater than the predetermined threshold.

7. The method of claim 1, further comprising determining whether the first framing is a positive framing, a negative framing, or a neutral framing, based on the natural language processing of the first text.

8. The method of claim 1, wherein performing the natural language processing of the first text comprises determining an embedding of one or more words of the first text.

9. The method of claim 8, further comprising determining the second text based on a cosine similarity between an embedding of one more words of the second text and the embedding of the one or more words of the first text.

10. The method of claim 1, further comprising determining the second text using machine learning techniques with an artificial neural network.

11. The method of claim 1, further comprising:
tracking framings of information presented to a user over a certain time period; and
outputting the framings of information presented to the user over the time period.

12. A system comprising:
a processing device; and
a non-transitory, processor-readable storage medium comprising one or more programming instructions stored thereon that, when executed, cause the processing device to:
receive first text conveying first information;
perform natural language processing of the first text;
determine a first framing of the first information based on the natural language processing of the first text;
determine a valence of the first framing;
determine an arousal level of the first framing;
generate, based on the valence of the first framing and the arousal level of the first framing. second text conveying the first information with a second framing, different from the first framing; and
output the second text on an electronic display.

13. The system of claim 12, wherein the instructions further cause the processing device to output the second text to replace the first text.

14. The system of claim 12, wherein the instructions further cause the processing device to output the second text as a supplement to the first text.

15. The system of claim 12, wherein the instructions further cause the processing device to:
determine an intensity of the first framing;
determine whether the intensity of the first framing is greater than a predetermined threshold; and
only determine the second text upon determination that the intensity of the first framing is greater than the predetermined threshold.

16. The system of claim 12, wherein the instructions further cause the processing device to perform the natural language processing of the first text by determining an embedding of one or more words of the first text.

17. The system of claim 16, wherein the instructions further cause the processing device to determine the second text based on a cosine similarity between an embedding of one more words of the second text and the embedding of the one or more words of the first text.

18. The system of claim 12, wherein the instructions further cause the processing device to
track framings of information presented to a user over a certain time period; and
output the framings of information presented to the user over the time period.

* * * * *

UNITED STATES PATENT AND TRADEMARK OFFICE
CERTIFICATE OF CORRECTION

| | |
|---|---|
| PATENT NO. | : 12,093,652 B2 |
| APPLICATION NO. | : 17/222045 |
| DATED | : September 17, 2024 |
| INVENTOR(S) | : Kent Lyons et al. |

It is certified that error appears in the above-identified patent and that said Letters Patent is hereby corrected as shown below:

In the Specification

In Column 5, Line(s) 03, before "text", insert --the--.

In Column 6, Line(s) 42, after "reader", delete "that" and insert --than--, therefor.

Signed and Sealed this
Eleventh Day of February, 2025

Coke Morgan Stewart
*Acting Director of the United States Patent and Trademark Office*